(12) United States Patent
Beekman

(10) Patent No.: US 8,067,741 B2
(45) Date of Patent: Nov. 29, 2011

(54) FOCUSED PINHOLE GAMMA DETECTION DEVICE

(75) Inventor: Frederik Johannes Beekman, Utrecht (NL)

(73) Assignee: Milabs B.V., Utrecht (NL)

( * ) Notice: Subject to any disclaimer, the term of this patent is extended or adjusted under 35 U.S.C. 154(b) by 344 days.

(21) Appl. No.: 12/338,869

(22) Filed: Dec. 18, 2008

(65) Prior Publication Data
US 2009/0159802 A1 Jun. 25, 2009

(30) Foreign Application Priority Data
Dec. 21, 2007 (EP) .................................... 07076118

(51) Int. Cl.
*G21K 1/02* (2006.01)
(52) U.S. Cl. .................................................. 250/363.1
(58) Field of Classification Search ................ 250/363.1
See application file for complete search history.

(56) References Cited

U.S. PATENT DOCUMENTS

| | | | | |
|---|---|---|---|---|
| 4,831,261 | A * | 5/1989 | Genna et al. ............. | 250/363.01 |
| 5,245,191 | A * | 9/1993 | Barber et al. ............. | 250/363.04 |
| 5,751,000 | A * | 5/1998 | McCroskey et al. ..... | 250/363.03 |
| 7,145,153 | B2 | 12/2006 | Beekman | |
| 7,199,371 | B2 | 4/2007 | Schramm et al. | |
| 2004/0232348 | A1 | 11/2004 | Beekman | |
| 2008/0116386 | A1 * | 5/2008 | Wagenaar et al. ....... | 250/370.09 |

FOREIGN PATENT DOCUMENTS

JP 53-126889 A 11/1978
WO WO-2007/105942 A2 9/2007

OTHER PUBLICATIONS

Schramm et al., 2003 IEEE Nuclear Science Symposium Conference Record/ 2003 IEEE Nuclear Science Symposium and Medical Imaging Conference, XP010736022; vol. 3, Oct. 19, 2003; pp. 2077-2079.
Van Der Have et al., 2003 IEEE Nuclear Science Symposium Conference Record/ 2003 IEE Nuclear Science Symposium and Medical Imaging Conference, XP010737590, vol. 4, pp. 2657-2661.

* cited by examiner

*Primary Examiner* — David Porta
*Assistant Examiner* — Shun Lee
(74) *Attorney, Agent, or Firm* — Birch, Stewart, Kolasch & Birch, LLP

(57) ABSTRACT

The invention provides a gamma detection device, a collimator for use therein, and use of such a collimator or device in imaging an object. The invention is directed to pinhole imaging with high energy photons, such as 511 keV photons. In order to achieve sufficiently low pinhole knife edge penetration, the collimator uses a plurality of focused clusters of pinholes, each with a smaller opening angle, and arranged such that all the combined fields of view of the individual pinholes in all clusters provide a large central field of view with still compact dimensions of the detection device. This is made possible since the field of view of a single cluster is divided up into a number of individual fields of view.

15 Claims, 2 Drawing Sheets

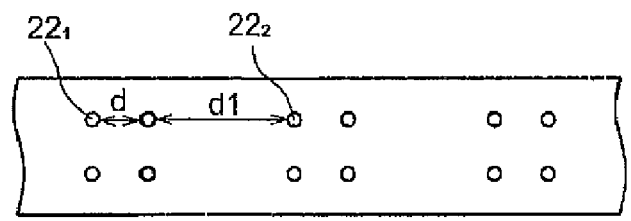
Fig. 3
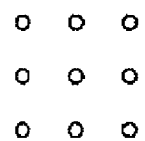
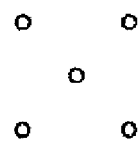
Fig. 4a    Fig. 4b    Fig. 4c
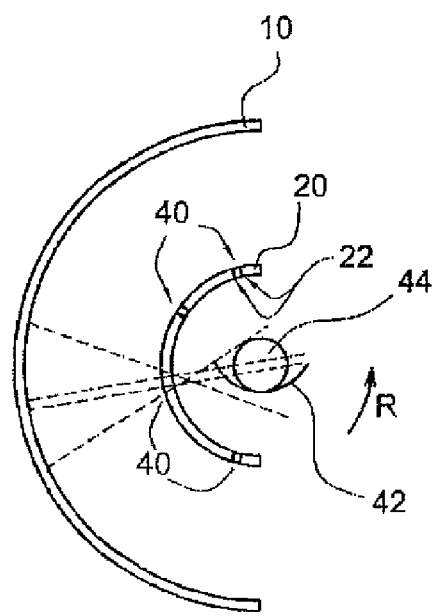
Fig. 5

FOCUSED PINHOLE GAMMA DETECTION DEVICE

FIELD OF THE INVENTION

The present invention relates to a focused pinhole gamma detection device, and to a collimator for use in such a focused pinhole gamma detection device. Focused pinhole gamma detection devices are amongst others used for small animal imaging for biomedical research, but also for other purposes such as clinical imaging and non-destructive testing.

BACKGROUND OF THE INVENTION

A known focused pinhole gamma detection device is the NanoSPECT/CT™, a.o. described in U.S. Pat. No. 7,199,371. This device comprises an object carrier, arranged to position an object to be examined (e.g. a small animal) in an object space and at least one detector having a detector surface and being sensitive to gamma-photons. A collimator is positioned between the at least one detector and the object space.

The collimator has a plurality of pinhole systems, each pinhole system having a plurality of pinholes with mutually non-parallel central lines, having a mutual distance d that is smaller than a distance d1 between any of the at least two pinholes of said pinhole system on the one hand and any pinhole of any other pinhole system on the other hand. Each pinhole system has a pinhole system field of view, that is seen by at least one of the pinholes of said pinhole system and that is composed of the fields of view of the plurality of pinholes. A common overlap of the pinhole system fields of view of the plurality of pinhole systems of the collimator defines a focus volume, that is seen by all pinhole systems.

The NanoSPECT/CT™ device has a collimator with up to four slabs, each having up to 10 pinholes, which are all focused, i.e. they all point toward the focus volume, or central field of view (CFOV).

A problem with this known device is that higher energy gamma radiation, such as positron annihilation radiation, penetrates the thinnest portions of the collimator, which portions are formed by the pinhole knife edges, to such a degree that image definition decreases unacceptably. In theory, this could be solved by decreasing the acceptance angle of the cones that lead toward the pinhole. However, this leads to a reduced CFOV and/or to a bulkier device, both of which is undesirable.

OBJECT OF THE INVENTION

It is an object of the present invention to provide a focused pinhole gamma detection device that has an improved definition but not at the cost of the CFOV or the compactness of the device.

SUMMARY OF THE INVENTION

This object is achieved with a focused pinhole gamma detection device, wherein at least one pinhole system is arranged and constructed such that, for at least one of, and preferably each of, the pinholes of said pinhole system, a portion of the focus volume is outside the field of view of said pinhole. The device according to the present invention achieves the above-mentioned object in that the pinholes in a pinhole system each have mutually different fields of view, and only together have a field of view that substantially matches the central field of view.

One could say that each pinhole of the known device is replaced by a "cluster" of pinholes, that each see a part of the field of view of the pinhole in the known device, and thus each see only part of the focus volume, or CFOV. Each of the pinholes in the cluster, which expression "cluster" will be used throughout this text as an synonym to "pinhole system having a plurality of pinholes", can be made with a smaller acceptance or opening angle. Thus, image definition can be improved. However, since each cluster as a whole samples, or images, a similar volume as one corresponding original pinhole, the device need not have a smaller CFOV or larger dimensions.

In this application, and as generally understood in the art, a field of view of a pinhole corresponds to a solid angle that is imageable by the pinhole, in other words the part of three-dimensional space that can be seen by the detector through the pinhole. Then, a pinhole system field of view is composed of the fields of view of the plurality of pinholes of the pinhole system, and is thus the part of 3D space that can be seen by the detector through at least one of the pinholes of the pinhole system.

The central field of view (CFOV) can be defined as the volume of the space that can be seen by all pinhole systems (of the collimator) as a whole, i.e. the overlap of all system fields of view. And just as, in conventional pinhole systems, at least two pinholes with their individual fields of view are required to define a CFOV or focus volume, in the present invention a plurality of pinhole systems is required to define a CFOV or focus volume.

Herein, the expression "at least one pinhole system is arranged and constructed such that, for at least one of, and preferably each of, the pinholes of said pinhole system, a portion of the focus volume is outside the field of view of said pinhole" relates to the following. The focus volume, i.e. central field of view, is, in prior art devices, the volume as seen by each individual pinhole.

In the known prior art NanoSPECT/CT™ device, the pinholes that are provided in an arrangement that might be called a "cluster", are each constructed and arranged to be focused on the same focus volume, in this case the central field of view, i.e. they are all made to "see" the same volume. Of course, it might happen that, due to production tolerance or the like, some pinhole in the known device does not "see" exactly the same (focus) volume. However, this is still in contrast with the present invention, where each pinhole in a cluster should have a field of view that does not "see" all of the focus volume as defined for all clusters, i.e. it is constructed and arranged not to see all of the focus volume.

Note also that the central lines of pinholes in a cluster are non-parallel. This not only leads to a total focus volume for the clusters being larger than could be obtained for parallel central lines, but it also makes it possible to design the system such that individual images do not overlap on the detector.

The central line corresponds to the line of maximum transmission, and is often roughly equal to, i.e. approximated by, a line of geometrical symmetry of the cones leading to the pinhole smallest opening. More in particular, in embodiments, a point of closest approximation of at least one set of central lines of two pinholes in a pinhole system is outside a centre of gravity of the focus volume. Herein, a point of closest approximation may be the centre of the shortest line segment connecting the two central, in the case of non-crossing lines, and may be the point of crossing for crossing lines.

The centre of gravity is the centre of the CFOV, in particular the geometrical centre, and may be determined as the physical centre of gravity of a corresponding homogeneous body. Preferably, the point of closest approximation is closer to an outer surface of said focus volume than to said centre of gravity of the focus volume. By positioning the point of closest approximation (POCA) outside the centre, it is ensured that the individual fields of view are aimed at different parts of the CFOV. The position of the POCA for each set of two pinholes depends on a number of factors, such as the desired magnification and the number of pinholes in a pinhole system.

In a particular embodiment, for at least one set of two pinholes in a pinhole system, the point of closest approximation lies outside the focus volume. In embodiments, said POCA lies between the collimator and the centre of gravity, in particular between the collimator and the focus volume. In the case of such positioning of the central lines, it is possible to have a good magnification with very closely spaced pinholes in a cluster. However, it is still possible that the central lines of two pinholes in a cluster have a POCA outside the centre of gravity of the focus volume, or even outside the focus volume altogether, and on the other side. In this case, however, the pinholes in the cluster are at a larger relative mutual distance.

Expressed in exemplary numbers, though not intended to be limiting, one could say that, in a cluster that has n pinholes, the individual field of view of a pinhole, and preferably each pinhole, in a cluster (or pinhole system) sees at least (100/n)%, but less than 100% of the focus volume, depending on the extent of the overlap between the individual fields of view within the cluster. In theory, 100/n % is possible with exactly complementary fields of view. In practice, some overlap to obtain a complete view will almost always be allowed.

In a particular embodiment, each pinhole of each pinhole system sees at the most 80%, and preferably less than 70%, of the focus volume. All this ensures the possibility to provide the individual pinholes with a smaller opening angle and, for the total system, still have the same or similar focus volume and total dimensions. Note, by the way, that this also ensures that, for the overlapping parts of individual fields of view, the total sensitivity is increased, by a factor roughly equal to the number of overlapping individual fields of view in a cluster.

In a particular embodiment, for a cluster of 2 pinholes, the individual field of view of each pinhole in said cluster sees, i.e. overlaps, more than 50% but at the most 80% of the CFOV. In a cluster of 4 pinholes, in particular in a regular two-by-two configuration, the individual field of view of each pinhole in said cluster sees more than 25% but at the most 70% of the CFOV. Corresponding figures for different pinhole numbers in a cluster may easily be determined. The above numbers allow a sufficient gain in image definition, by decreasing edge penetration.

In the present context, "mutual distance" between the pinholes relates of course to the smallest, or nearest neighbour distance between pinholes in a pinhole system.

Furthermore, in the present invention, the image information is distributed over possibly more pinholes, and thus more images on the detector, than in prior art devices. Since an image of the focus volume is composed of a plurality of partial images, additional calculations are needed to produce an image, and subsequently a reconstruction, of the object to be examined. However, these additional calculations are rather straightforward, especially if the partial images on the detector(s) are mutually substantially separated, i.e. show at the most 10% overlap on the detector, and more preferably no overlap. This latter situation is preferable, although in no way deemed to be a limitation of the present invention.

It is noted that JP 53-126889 discloses an X-ray transmission detection device having a multiple pinhole collimator. However, apart from the facts that penetration is not an issue at X-ray energies, and that it is not a gamma detection device in which the collimator is positioned between the detector and an object space, the pinhole geometry is completely irrelevant here, since the field of view and the magnification are determined by the extension of the source FH and that of the detector. The pinhole only serves to provide an image magnification, it does not require walls to determine a cone of acceptance, and image blur through penetration of the wall at a pinhole knife edge does not play a role here.

The present device is suitable for use with gamma radiation. Such high energy radiation offers a useful range of radiation, having high penetration power. In general, a higher photon energy offers more penetration power. Thus, this radiation may come from deeper in the object, such as the body of an animal or human being, without being attenuated too much. However, this increased penetration power also holds for the imaging device, and thus leads to image blurring. Furthermore, different gamma tracers that are injected or otherwise introduced into the animal or object may have different photon energies, and sometimes a specific tracer is required to examine a specific organ or process in a body, which tracer may happen to have a high photon energy. Then, according to the present invention, it is useful if images from such higher energy radiation may be obtained at a higher resolution than for conventional gamma detection devices. An extremely useful energy is 511 keV, produced by electron-positron annihilation. Many tracers with unique applications provide such radiation, which has, however, such a high energy that this poses problems for prior art detection devices that rely on collimators. The present invention provides a particularly useful solution for detection problems with this radiation, although of course other energy ranges are mentioned here as well. The penetration problems are not only dependent on the absolute photon energy, but also on the relative dimensions of the device. For example, for miniaturized devices, radiation energies as low as 30 keV could already lead to some image blurring. Thus, the invention is deemed to provide advantageous results for gamma photon energies of at least 30 keV.

According to the present invention, there are at least two pinholes in a cluster. Preferably, however, a pinhole system, or cluster, comprises at least three pinholes arranged on a polygon. Advantageously, the pinholes are arranged rotationally symmetrically on said polygon. Having at least three pinholes allows a favourable distribution of the focus volume over individual fields of view in the cluster. It is also possible to provide more pinholes in such a cluster, such as four, five or six, in each case arranged on a regular square, pentagon, hexagon, respectively, or five, six or seven pinholes with in each case one pinhole within a regular square, pentagon, or hexagon, respectively. Other arrangements, such as irregular polygons are of course possible.

In embodiments, a pinhole system comprises a regular lattice of at least 2×2 pinholes, and at most 4×4 pinholes. Such embodiments allow relatively easy calculations, through their regular arrangement. The 2×2 lattice of course corresponds to the above-mentioned square arrangement, and is a very attractive arrangement with a good compromise between complexity and advantage in image quality. While higher numbers should not be excluded, they tend to be much more complex to produce, while showing only minor improvements in penetration resistance and image sharpness.

In possible embodiments, the pinholes in a cluster are arranged as if on a helix or on a set of parallel planes as is described in U.S. Pat. No. 7,145,153 in the name of the present inventor, which is incorporated herein by reference. Thus, a cluster then forms a part of such a helix or stack of parallel planes. It is e.g. possible to select groups of pinholes on a helix or stack of parallel planes, each such group forming a cluster, by leaving out pinholes between the clusters, such that the distance between neighbouring clusters is larger than the distance between pinholes within a cluster.

In possible embodiments of the invention, the total opening angle of an individual, preferable each, pinhole is from 5 to 40 degrees, preferably from 10 to 35 degrees, in each case inclusive. These ranges have turned out to be useful as regards a sufficiently large field of view, and hence magnification, resolving power and dimensions, on the one hand, and sufficient radiation hardness on the other. In this context, the total opening angle relates to the full opening angle of the cones leading to the pinhole, which could in theory be more than 90 degrees, and not to the maximum angle with the central line, which is by definition smaller than 90 degrees. Furthermore, it is advantageous when the limiting opening angle of a pinhole system, i.e. the opening angle of the total field of view as seen at great distance, is not more than about 60 degrees. This means that, preferably, the opening angle of an individual pinhole in a cluster of n pinholes need not be larger than about 60 degrees/sqrt(n) and allowing for some overlap of the cones in the focus volume.

In other embodiments, the total opening angle of the pinhole system is larger, up to 120 degrees. This allows to position the collimator very close to the object to be imaged. This is advantageous for the resolution and sensitivity. Herein, use is made of the fact that in a cluster, the individual pinholes have smaller opening angles.

In preferred embodiments, an angle between central lines of neighbouring pinholes in a pinhole system is larger than zero degrees but smaller than their opening angle. This ensures that overlap between their respective fields of view is possible. Note that non-neighbouring pinholes in a pinhole system need not have overlapping fields of view.

Preferably, the central lines of the pinholes in a pinhole system are arranged regularly. E.g., in a ring collimator with 2×2 pinhole systems arranged on a circle, the central lines of the pinholes in each pinhole system preferably subtend equal angles with respect to the normal to the collimator surface, taken in the centre of the pinhole system. All this may be correspondingly adapted in focused pinhole systems with pinhole systems in more than one ring, etc.

In preferred embodiments, the central lines of two neighbouring pinholes in a pinhole system have a point of closest approximation that is between the collimator and the focus volume. Herein, it is easier to create overlapping fields of view in the focus volume but also non-overlapping images on the detector, although such overlap on the detector is not necessarily excluded.

In advantageous embodiments, the collimator has at least four pinhole systems, preferably at least ten pinhole systems. This ensures not only sufficient angle information and sensitivity of the device, but also a limited complexity. The possible number of pinhole systems is of course not limited, and could for example be 75, cfr. the prior art devices USPECT-I and II with 75 individual pinholes, arranged as five ring collimator bodies with 15 pinholes each.

In some embodiments, the collimator has a collimator body formed as a ring or section of a ring, which allows as much as possible a symmetric design with equivalent pinhole systems.

In another embodiment, the collimator has a collimator body formed as a flat plate, with a plurality of pinhole systems in said plate.

Also possible is a collimator body constructed of a plurality of ring parts or flat plates, connected to form a circumferential collimator body, such as a polyhedron. Each such ring part or plate has at least one pinhole system. Herein, a ring part may be a part of a cylinder, but could also have any other curved shape.

In the above, a collimator can comprise a plurality of parts, either connected or not.

The device can be equipped with controllable drive means for imparting a motion to the collimator (or the collimator and the detector together), e.g. which allow the collimator or collimator plus detector to be rotatable around an axis, preferably a symmetry axis of the collimator, which in that case of course has to have symmetry of its own, such as a rotational symmetry. This rotatability allows sufficient angle information to be obtained. Preferably, especially in the case of a collimator that does not extend around the object space in a complete circle, the collimator is rotatable over at least 180 degrees, more preferably over at least 180 degrees plus the full opening angle of a pinhole system. In some cases, such half-circle rotation is not necessary, such as for sparse objects.

Note that further details, such as of a movability of the object carrier, graphical user interfaces, additional so-called framing plates between the collimator and the detector, and so on, are generally known in the art and may be included where desired. Details may be found in e.g. prior patent devices and applications by applicant, such as the already mentioned USPECT II and WO2007/105942, and U.S. Pat. No. 7,145,153, all of which are incorporated herein by reference.

Advantageously, two or more, and preferably all, of the pinholes of a pinhole system are provided in a monolithic body of a material with low radiation penetration, such as tungsten, iridium, gold, platinum or depleted uranium. This offers the possibility of providing each pinhole system in a separate body that is to be mounted in a collimator body, that itself could be made of a different material, e.g. lead or the like. This offers a cost reduction, but also flexibility, in that bodies with such pinhole systems or pinhole apertures may be exchanged for bodies with other pinhole systems or apertures. Of course, it is still possible to provide the pinholes in the collimator body itself, the complete collimator then being a unitary body.

Particularly advantageous devices according to the invention are a single photon emission computed tomography scanner, or so-called SPECT scanner, and a positron emission tomography scanner, or PET scanner. A PET scanner uses the fact that, when a positron electron pair is annihilated, two 511 keV photons traveling in opposite directions are emitted simultaneously. Then, by locating two photons on the detector within a small time frame, the line at which annihilation took place can be found, which provides the conditions of mapping the tracer. However, one can also use each of the photons as separate, single photon events, by including a collimator according to the invention, in fact turning the PET scanner into scanner according to the SPECT principle, but suitable for imaging isotopes as normally used in "co-incidence" PET.

The invention also relates to a collimator for use in the detection device according to the present invention. With such a collimator, a high resolving power is possible even for high energy photons, such as 250 keV and higher, while still retaining a good compromise between total dimensions and central field of view.

Generally, the advantages as discussed for the detection device according to the invention hold for a collimator with similar features. Hence, each and every advantageous feature with respect to the collimator of the device according to the invention also holds as advantageous for the collimator itself. Therefore, a discussion of particular embodiments can be very brief to prevent unnecessary repetition.

The invention also relates to use of a collimator according to the invention, and in particular a device according to the invention, in imaging an object to be examined, to which object a gamma tracer, in particular having a photon energy of at least 30 keV, preferably at the most 511 keV, has been provided. In this use, or method, an object to be examined, such as an animal or a human, is provided with a gamma tracer that emits high energy photons, such as 511 keV photons. The object is then positioned in front of a detector, with the collimator in between, after which an image is formed.

The invention will now be explained by means of non-limiting embodiments, with reference to the drawings.

BRIEF DESCRIPTION OF THE DRAWINGS

FIG. 3 schematically shows an example of a part of a collimator;

FIGS. 4a, 4b and 4c show some examples of other arrangements of individual pinholes in a cluster; and FIG. 5 schematically shows a detection device according to the invention.

DETAILED DESCRIPTION OF THE DRAWINGS

Figure 1:
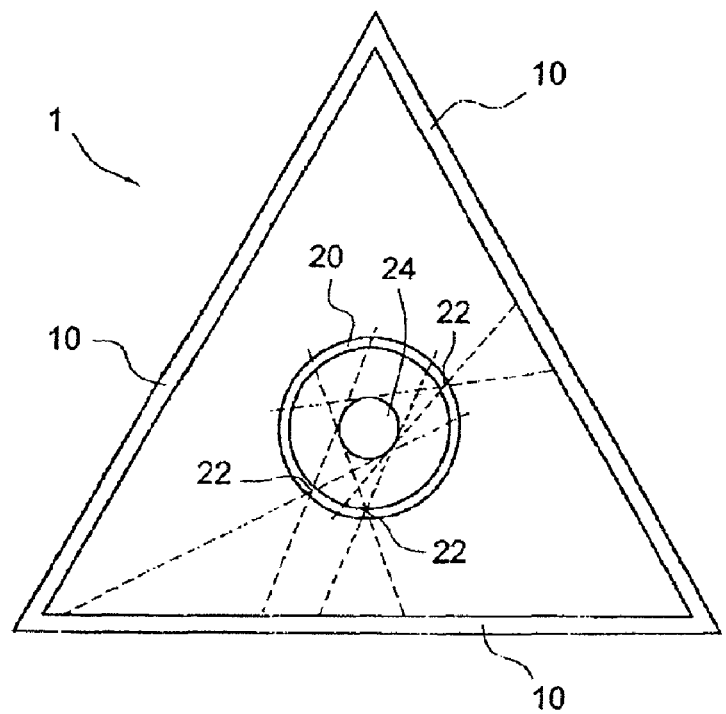
FIG. 1 schematically shows a prior art detection device, in cross-sectional view.

FIG. 1 schematically shows a prior art detection device 1, in cross-sectional view. Herein, there are provided three detectors 10, in a triangular housing, as well as a collimator 20 with pinholes 22, only three of which pinholes are shown here.

The fields of view of the pinholes, indicated by dashed lines, define a central field of view CFOV, depicted here as a central circle 24.

This is a very general layout as might be used for e.g. a SPECT scanner. The number of pinholes is freely selectable, and may reach numbers as high as 75 in the USPECT-I and II by Milabs B. V. Very strictly speaking, the central field of view (CFOV), which is the volume that is seen by all of the pinholes 22, is a polygonal volume. However, it is limited by a circular volume. If the collimator 20 is made rotatable, the central field of view 24 becomes an exact circle. Within the CFOV, high quality images of an object may be obtained. Note that other arrangements, such as four detectors 10 in a square, or a single plate detector that is moveable, in particular rotatable around an axis that extends through the CFOV 24, are also possible.

The detectors 10 may be made of e.g. scintillator material, known per se, photomultipliers, and so on, or combinations. Their sensitivity may be selected as desired, but for the present invention, the sensitivity should be sufficiently high at gamma photon energies of about 30 keV or higher, up to about 511 keV, although higher energies are not excluded.

In the prior art detection device of FIG. 1, each pinhole 22 "sees" all of the CFOV 24. Thereto, it has relatively large opening angle, of about 50°. The central lines of the pinholes 22 all point towards the centre (of gravity) of the focus volume 24.

Figure 2A:
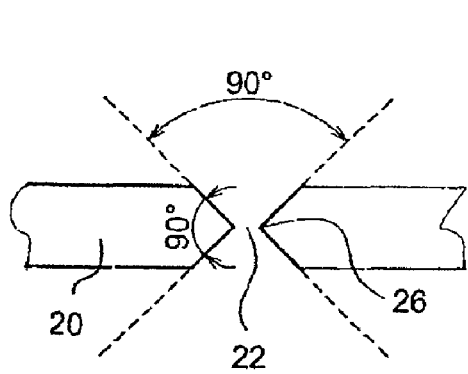
FIG. 2a and 2b show a comparison between a prior art pinhole and a pinhole system or 'cluster' according to the present invention.
Figure 2B:
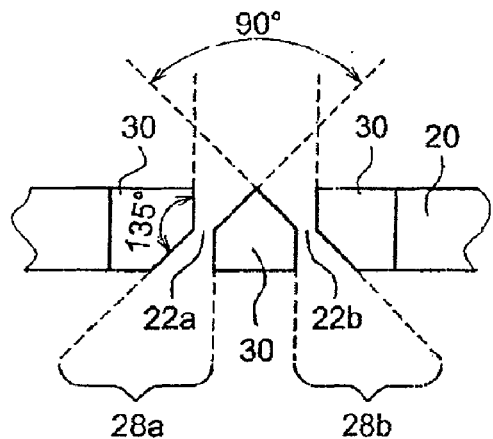

FIGS. 2a and 2b show a comparison between a collimator with a prior art pinhole (FIG. 2a) and an example of a collimator with a pinhole system or 'cluster' according to the present invention (FIG. 2b).

FIG. 2a shows in cross section a part of a collimator 20 with a single pinhole, with an opening angle of the cones of about 90° (this large angle has been shown here for clarity only). Therefore, the so-called pinhole knife edge 26 is also 90°. At the very tip of the edge, the material of the collimator is very thin, and easily penetrated by high energy radiation.

An embodiment of the invention is shown in FIG. 2b. It shows, in cross-sectional view also, a portion of a collimator with a cluster of two neighbouring pinholes 22a and 22b. Here, the opening angle of the total pinhole system is also 90°, but the field of view of the pinhole system is composed of the fields of view of the two pinholes 22a and 22b, each providing about half of it. This allows the knife edge to be 135° instead of 90°, which greatly improves its resistance against radiation penetration. Note furthermore that the images on the detector, deriving from cones 28a and 28b, do not overlap (in this embodiment). No overlap of the images is the preferred embodiment, but as explained herein an overlap may be present. This is however not excluded.

Furthermore, the fields of view show some overlap in the middle, which slightly increases sensitivity. Moreover, it is possible to allow a larger overlap of the fields of view, by tilting the cones of the pinholes a bit further. Also, other opening angles may also be used. In practice, total opening angles of the entire cluster of at most 60° instead of 90° will prevail. Then, individual opening angles of the pinholes in a cluster will be less than 40°, such as 20°. Knife edge angles will then be about 150° or 160° as preferred, which gives a very high stopping power at the knife edges.

Note that in the case of FIG. 2b, and assuming circular pinholes 22a, 22b, the field of view in the direction perpendicular to the plane of the paper is halved. Of course, in reality, an array of 2×2 pinholes could be used. Furthermore, it is important to note that such cluster of pinholes is to serve in the same way as each pinhole 22 in FIG. 1, i.e. each cluster as a whole should be focused on the CFOV. This also means that the central lines and of the pinholes 22a and 22b cross at POCA (point of closest approximation), which will be rather close to the collimator 20, and well before the CFOV as would be present if 22a and 22b would be the pinholes of FIG. 1. Note that, contrarily, the central lines of the fields of view of the pinholes 22 according to the prior art, are all directed towards the centre (of gravity of) the CFOV 24 in that FIG. 1.

Preferably the pinholes of a pinhole system are provided in an exchangeable part 30 of the collimator, as for example the pinholes 22a and 22b. Although apparently in FIG. 2b being built up of three separate parts, in reality it could be a unitary exchangeable part to be mounted releasably in a main body of the collimator. This part 30 may be made of a material that is different from that of the main body of the collimator 20. Usually, the main body of the collimator 20 may be made of a material with good but not extreme stopping power, and often rather low cost, such as lead or tungsten. The material of the exchangeable part wherein the pinholes 22a and 22b are made, thus of part 30, may then be a high stopping power material, such as gold, platinum, tungsten, iridium or (depleted) uranium. Often, these materials are much more expensive or poisonous, and should be used as little as possible. FIG. 3 schematically shows an example of a part of a collimator 20 with three such clusters, each with a 2×2 array of pinholes. The distance d between the pinholes $22_1$ in the leftmost pinholes is smaller than the distance d1 between the pinholes $22_1$ of the leftmost cluster and the pinholes $22_2$ of the middle cluster.

FIGS. 4a, 4b and 4c show some examples of other arrangements of individual pinholes in a cluster. They show a triangular configuration, a 3×3 array and 2×2 plus central pinhole arrangement, respectively. It will be clear that the opening angles, determining the individual fields of view, of the pinholes can be adapted accordingly, those of the pinholes of the 3×3 arrangement usually being smaller than those of the triangular three pinhole configuration.

FIG. 5 schematically shows an example of a detection device according to the invention, in cross-sectional side elevational view, with a detector 10, a collimator 20 and an object carrier 42, carrying an object 44 in the object space.

For instance the object carrier is embodied as a small animal carrier, for example for an experimental animal as a mouse, rat or other rodent, e.g. embodied as a tubular carrier (preferably transparent) into which the small animal is introduced for examination in the detection device. Yet other object carriers are possible, e.g. for a human body (e.g. as a bed) or part of the human body.

Both the detector 10 and the collimator 20 are semicircular in this example, and can rotate, as a unit, around an axis and in a direction indicated by arrow R, by means of a drive means, non-shown here. Preferably, the angle of rotation is at least 180°, such as to obtain full angle information about a distribution of a gamma tracer in object 44.

The collimator could also be of tubular design. For instance the collimator can be of a circular cross-section, or triangular cross-section, a rectangular cross-section. The collimator may be composed of ring shaped bodies, but could e.g. also be composed of panels, e.g. planar panels.

The collimator 20 here has four pinhole systems 40, in this case each with a 2×2 array of pinholes 22, of which in each case only two are shown. All pinhole systems are focused toward a focus volume (not indicated separately, but similar to FIG. 1) of an object space, in which the object 44 is positioned. Each pinhole 22 of each system only sees part of that focus volume (or CFOV), while each pinhole system 40 sees the full focus volume. In this way, the dimensions of this detection device need not be different from those of the prior art with single pinhole systems.

The focus volume may have a centre of gravity that is of spherical shape, e.g. as an ellipsoid.

As is preferred a point of closest approximation of at least one set of central lines of two pinholes in a pinhole system is outside the centre of gravity of the focus volume. More preferably the point of closest approximation is closer to an outer surface of said focus volume than to said centre of gravity of the focus volume.

Indicated by way of example in the FIG. 5 are the fields of view of two individual pinholes of a pinhole system 40, here as cones bordered by dashed lines. It can clearly be seen that each individual field of view sees little over half of the object 44, while all of the object 44 is seen by the fields of view of the pinhole system. It is however also possible that the fields of view are smaller; both the individual fields of view and the total field of view of a pinhole system. E.g. this allows imaging of only a part of the object 44. Often, this offers more resolution and thus finer detail. It is then advantageous if the object can be moved through the central field of view, in order to be able to examine the full object. The central lines of these two pinholes, although not indicated, cross between the collimator 20 and the centre of gravity of the central field of view, which is located in the object 44.

What is claimed is:

1. A focused pinhole gamma detection device, comprising:
    at least one detector, having a detector surface and being sensitive to gamma-photons;
    a collimator; and
    an object carrier, arranged to position an object to be examined in an object space,
    wherein the collimator is provided between the at least one detector and the object space,
    wherein the collimator has a plurality of pinhole systems, each of said pinhole systems having a plurality of pinholes having mutually non-parallel central lines, having a distance d between any two of said plurality of pinholes that is smaller than a distance d1 to any pinhole of an adjacent one of said pinhole systems, and having a pinhole system field of view, that is composed of the fields of view of the plurality of pinholes,
    wherein all of said pinhole systems are constructed and arranged so as to establish a common overlap of their pinhole system fields of view, said overlap defining a focus volume, that is seen by all pinhole systems of the device,
    wherein a portion of the focus volume is outside the field of view of at least one of the pinholes of at least one of said pinhole systems, and
    wherein a point of closest approximation of at least one set of central lines of two pinholes in at least one of said pinhole systems is outside a centre of gravity of the focus volume.

2. The detection device according to claim 1, wherein a portion of the focus volume is outside the field of view of each of said pinholes of at least one of said pinhole systems.

3. The detection device according to claim 1, wherein for at least one set of central lines of two pinholes in said at least one pinhole system, the point of closest approximation lies outside the focus volume.

4. The detection device according to claim 1, wherein said point of closest approximation lies between the collimator and the centre of gravity of the focus volume.

5. The detection device according to claim 1, wherein at least one of said pinhole systems comprises at least three pinholes arranged on a polygon.

6. The detection device according to claim 5, wherein said at least three pinholes are arranged rotationally symmetrically on said polygon.

7. The detection device according to claim 1, wherein at least one of said pinhole systems comprises an arrangement of pinholes in regular lattice chosen from the group of 2×2 pinholes, 3×3 pinholes and 4×4 pinholes.

8. The detection device according to claim 1, wherein the total opening angle of an individual pinhole of at least one of said pinhole systems is from 5 to 40 degrees, inclusive.

9. The detection device according to claim 1, wherein the collimator has a symmetry axis and is rotatable around said symmetry axis.

10. A focused pinhole gamma detection device, comprising:
    at least one detector, having a detector surface and being sensitive to gamma-photons;
    a collimator; and
    an object carrier, arranged to position an object to be examined in an object space,
    wherein the collimator is provided between the at least one detector and the object space,
    wherein the collimator has a plurality of pinhole systems, each of said pinhole systems having a plurality of pinholes having mutually non-parallel central lines, having a distance d between any two of said plurality of pinholes that is smaller than a distance d1 to any pinhole of an adjacent one of said pinhole systems, and having a pinhole system field of view, that is composed of the fields of view of the plurality of pinholes,
    wherein all of said pinhole systems are constructed and arranged so as to establish a common overlap of their pinhole system fields of view, said overlap defining a focus volume, that is seen by all pinhole systems of the device, wherein a portion of the focus volume is outside the field of view of at least one of the pinholes of at least one of said pinhole systems, and wherein the central lines of two neighbouring pinholes in at least one of said pinhole systems have a point of closest approximation that is between the collimator and the focus volume.

11. The detection device according to claim 10, wherein a portion of the focus volume is outside the field of view of each of said pinholes of at least one of said pinhole systems.

12. The detection device according to claim 10, wherein at least one of said pinhole systems comprises at least three pinholes arranged on a polygon.

13. The detection device according to claim 12, wherein said at least three pinholes are arranged rotationally symmetrically on said polygon.

14. The detection device according to claim 10, wherein at least one of said pinhole systems comprises an arrangement of pinholes in regular lattice chosen from the group of 2×2 pinholes, 3×3 pinholes and 4×4 pinholes.

15. The detection device according to claim 10, wherein the total opening angle of an individual pinhole of at least one of said pinhole systems is from 5 to 40 degrees, inclusive.

\* \* \* \* \*